United States Patent [19]
Mardiguian et al.

[11] 3,891,622
[45] June 24, 1975

[54] HEPARIN ESTERS

[75] Inventors: Jean Mardiguian; Pierre Fournier, both of Paris, France

[73] Assignee: Societe anonyme dite: MAR-PHA, Societe d'Etude et d'Exploitation de Marques, Paris, France

[22] Filed: Aug. 14, 1972

[21] Appl. No.: 280,175

[30] Foreign Application Priority Data
Aug. 16, 1971 United Kingdom............... 38371/71

[52] U.S. Cl.............................. 260/211 R; 424/183
[51] Int. Cl.............................................. C08b 19/03
[58] Field of Search..................... 260/211 R, 234 R

[56] References Cited
UNITED STATES PATENTS

| | | | |
|---|---|---|---|
| 2,660,577 | 11/1953 | Kerr et al........................ | 260/234 R |
| 3,023,183 | 2/1962 | Nelson............................ | 260/234 R |
| 3,207,663 | 9/1965 | Nomine et al. ................. | 260/211 R |
| 3,232,838 | 2/1966 | Nomine et al. ................. | 260/211 R |

*Primary Examiner*—Johnnie R. Brown
*Attorney, Agent, or Firm*—Millen, Raptes & White

[57] ABSTRACT

Heparin in which the carboxyl groups, but not the sulphate groups, are esterified with a pyridylalkanol, an optionally substituted phenol, or an ω-hydroxyalkanoamide, have a long-lasting anti-coagulant activity.

14 Claims, 1 Drawing Figure

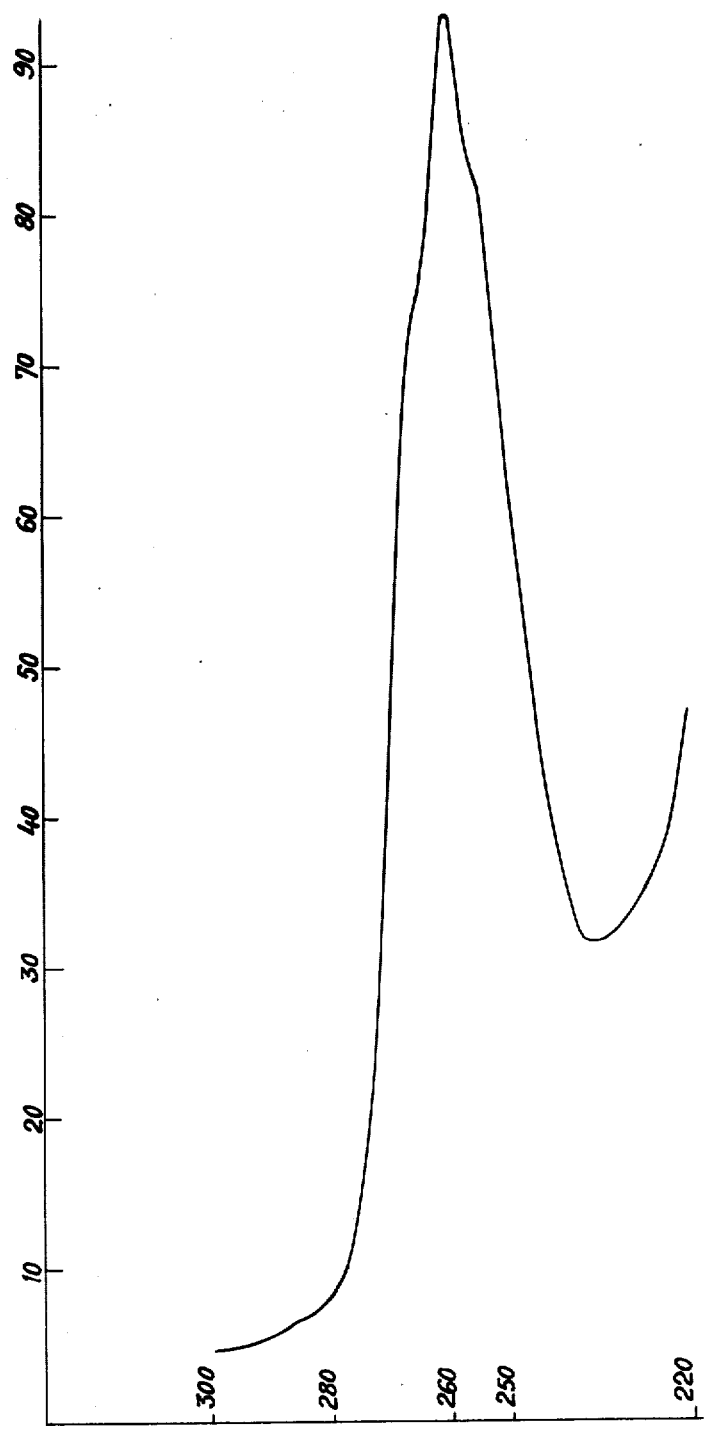

HEPARIN ESTERS

Heparin is a natural mucopolysaccharide of animal origin which is used in therapy as its sodium or calcium salt for its anticoagulant and clarifying properties.

It consists principally of a 1 → 4 chain of 2-amino-2-dioxy-α-D-glucose and hexuronic acids (D-glucuronic acid and/or L-iduronic acid) which are more or less sulphated.

Its structure is generally represented by the following tetrasaccharide unit:

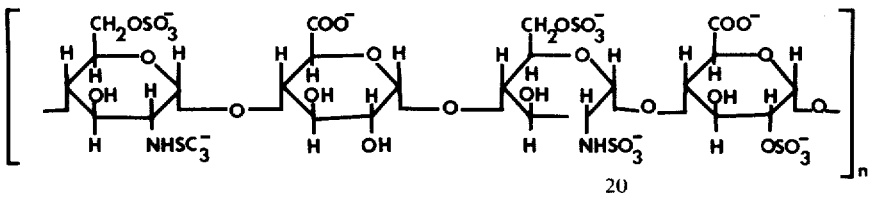

which possesses two carboxyl groups, two sulphamic groups and three sulphuric ester groups.

The present invention provides new heparin esters with a long-lasting action, obtained by the direct esterification, which may be partial or complete, of the carboxyl groups of heparin by an alcohol or a phenol chosen from the category comprising:

A. lower pyridylalkanols of the formula:

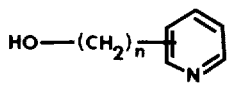

in which $n$ is 1, 2 or 3;

B. optionally substituted phenols of the formula:

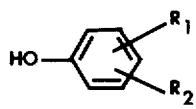

in which $R_1$ and $R_2$ each denote H, $NO_2$ or COOR, where R is H or alkyl of 1 to 4 carbon atoms;

C. ω-hydroxy-amides of the formula:

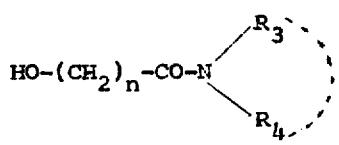

in which $n$ is 1, 2 or 3, and $R_3$ and $R_4$, taken separately, are each alkyl of 1 to 4 carbon atoms or, taken together with the nitrogen atom to which they are attached, form a nitrogen-containing heterocyclic ring with 5 or 6 ring atoms which can contain a second heteroatom, especially a piperidino, piperazino or morpholino ring.

The alcohol or phenol can be chosen for its physico-chemical properties if it is desired to alter the solubility of the heparin or to obtain an ester more or less resistant to enzymatic hydrolysis, or for its own therapeutic properties. Suitable compounds of the latter type are alcohols or phenols which are active in lipid metabolism (for example, pyridylmethanols) or which inhibit platelet aggregation.

In the new heparin esters, the sulphate groups and non-esterified carboxyl groups can be made into salts with alkali metal or alkaline earth metal cations such as Na, K, Ca and Mg, with quaternary ammonium cations such as choline, betaine and hyamine, or with tertiary bases.

Depending on the nature of the alcohol or phenol, the properties of the heparin esters obtained differ from those of heparin in:

their solubility in water which can be less than that of heparin, and their liposolubility which can be greater; and their anti-coagulant activity which has the two following characteristics:

1. their actual activity is a function of the degree of esterification and is between 40 and 90 I.U./mg., and 2. their potential activity, which results from the hydrolysis of the ester group, is between 120 and 150 I.U./mg.

The esterification of the carboxyl groups of heparin thus makes it possible to inactivate the anti-coagulant action of heparin partially or completely and to restore it gradually within the organism. The new heparin esters thus have a long-lasting action. Furthermore, they are capable of passing through the intestinal wall and can thus be administered orally as well as intravenously, intramuscularly and subcutaneously.

In addition, they possess the clarifying and hypolipaemic action of heparin.

The process of the invention consists of preparing, first, a heparin salt in which the sulphate groups are salified with a quaternary ammonium group (this is in order to obtain a form of heparin which is soluble in organic solvents) and in which the carboxyl groups are in the free form; for example, a neutral heparin salt is used in which the sulphate and carboxyl groups are salified with a quaternary ammonium group, and this salt is treated with an ion exchange resin in the acid form.

The esterification reaction of this heparin salt is carried out at a low temperature in a nonhydroxylic solvent (such as dimethylformamide or methylene chloride), in the presence of the alcohol or phenol and a condensation agent of the carbodiimide type. After the reaction, the heparin ester salt is precipitated and recovered.

The degree of esterification depends on the working conditions, namely the nature of the alcohol or phenol, the duration of the reaction, and the proportions of reagents.

The Examples below illustrate the invention. Examples 1 and 2 illustrate two cases of esterification of heparin, one of them being partial (Example 1) and the other practically complete (Example 2).

EXAMPLE 1

HEPARIN ESTER OF 3-PYRIDYLMETHANOL

A solution of 3.47 g. of neutral hyamine heparinate (benzethonium or Hyamine 1,622, sold by Messrs. Rohm and Haas) in 70 ml. of 95% ethyl alcohol is passed slowly over a carboxyl ion-exchange resin in the acid form (Bio-Rex 70 type). Elution is carried out with 200 ml. of 95% ethyl alcohol. After evaporation of the alcohol in vacuo, 2.45 g. of the acid salt of hyamine (I) (a heparin salt in which the sulphate groups are salified with hyamine and the carboxyl groups are free) are obtained.

Esterification

A solution of 1.62 g. of 3-pyridylmethanol and 4.1 g. of dicyclohexylcarbodiimide in 35 ml. of dimethylformamide is added slowly to a solution of 1.725 g. of (I) in 5 ml. of dimethylformamide cooled to 0°C. The mixture is left to stand at 0°C. for 2 days. After removing the precipitate of urea, 25 ml. of 95% ethyl alcohol and 8 ml. of 10% sodium acetate solution in methanol are added to the filtrate.

The precipitate is collected by centrifuging and, after washing with 95% ethyl alcohol, ultrafiltration on a U M 05 membrane (A-micon) and lyophilisation, 0.763 g. of 3-pyridylmethyl heparin ester (II A), in the form of the sodium salt, is obtained.

Analysis of (II A)

| | |
|---|---|
| Anti-coagulant activity: | 90 I.U./mg. |
| Sulphur content: | 11.25% |
| Nitrogen content: | 2.8% |

The ultra-violet absorption spectrum has a maximum at 260 nm with $E_{1cm}^{1\%}$ equal to 22.2. The infra-red spectrum has an ester band at 5.8 $\mu$.

Saponification 0.131 g. of the ester (II A) is dissolved in 4.6 ml. of N sodium hydroxide solution, cooled to 0°C. under an atmosphere of nitrogen. After dissolving, the mixture is left to stand for 1 hour 15 minutes and then the solution is adjusted to pH 6.6 by adding N hydrochloric acid.

After ultrafiltration on a U M 05 membrane and lyophilisation, 0.114 g. of sodium heparinate, with an anti-coagulant activity of 128 I.U./mg. is obtained.

EXAMPLE 2

HEPARIN ESTER OF 3-PYRIDYLMETHANOL

Esterification

A solution of 0.45 g. of 3-pyridylmethanol and 0.836 g. of dicyclohexylcarbodiimide in 10 ml. of dimethylformamide is added slowly to a solution of 0.448 g. of (I), prepared as in Example 1, dissolved in 5 ml. of dimethylformamide and kept at 0°C. The mixture is left to stand at 0°C. for 5 days. After filtering off the precipitate of urea, 8 ml. of a 10% solution of sodium acetate in methanol, followed by 15 ml. of 95% ethyl alcohol, are added. After being left to stand under cold conditions, 0.178 g. of the sodium salt of 3-pyridylmethyl heparin ester (II B) is isolated by filtration.

Analysis of (II B)

| | |
|---|---|
| Anti-coagulant activity: | 33 I.U./mg. |
| Nitrogen: | 3.7% |
| Sulphur: | 11.2% |

The ultra-violet spectrum has a maximum at 260 nm with an absorption coefficient $E_{1cm}^{1\%}$ equal to 30 (see the single accompanying drawing). The infra-red spectrum has an ester band at 5.8 $\mu$.

Saponification 0.083 g. of the ester (II B) is dissolved in 5 ml. of N sodium hydroxide solution, cooled to 0°C. under an atmosphere of nitrogen. The constituents are left in contact for 2 hours and then 10 ml. of distilled water and 4.9 ml. of N hydrochloric acid are added. After ultrafiltration on a U M 05 membrane and lyophilisation, 0.067 g. of sodium heparinate, with an anti-coagulant activitiy of 103 I.U./mg., is obtained.

Anti-Coagulant action in vivo

This action was studied in rabbits. It was measured by determining the coagulation time (activated by celite) at regular intervals after subcutaneous injection.

The product was administered at a dose of 400 units per kg. The following results were obtained:

| Hours after Administration | Activated coagulation time |
|---|---|
| 0 | 2.45 |
| 1 | 3.30 |
| 2 | 4 |
| 3 | 3.40 |
| 4 | 3.20 |
| 5 | 3 |
| 6 | 3 |
| 7 | 3 |

This ester thus possesses a long-lasting anti-coagulant action at doses (expressed in actual units) which are lower than those of heparin.

EXAMPLE 3

HEPARIN ESTER OF METHYL p-HYDROXYBENZOATE

A solution of 7.3 g. of methyl p-hydroxybenzoate and 9.3 g. of dicyclohexylcarbodiimide in 45 ml. of dimethylformamide is added slowly to a solution of 3 g. of (I), prepared as in Example 1, dissolved in 30 ml. of dimethylformamide and kept at 0°C. The mixture is left to stand at 0°C. for 3 days. After filtering off the precipitate of urea, 50 ml. of a 10% solution of sodium acetate in methanol, followed by 30 ml. of 95% ethyl alcohol, are added. 1.25 g. of heparin ester, as the sodium salt, are isolated by filtration.

Analysis

| | |
|---|---|
| Nitrogen: | 2.1% |
| Sulphur: | 11.7% |

Infra-red spectrum: ester band at 5.8 $\mu$.

Anti-Coagulant Activity

The actual activity, determined according to the method of the Pharmacopee Francaise, is 65 I.U./mg. The potential activity, i.e., that measured after hydrolysis in N sodium hydroxide solution for one hour at 0°C. is 130 I.U./mg.

Anti-Coagulant Action in vivo

This action was studied in rabbits. It was measured by determining the coagulation time (activated by celite) at regular intervals after subcutaneous injection.

The product was administered at a dose of 600 units per kg. The following results were obtained:

| Hours after Administration | Activated Coagulation Time |
|---|---|
| 0 | 3 |
| 1 | 3 |

-Continued

| Hours after Administration | Activated Coagulation Time |
|---|---|
| 2 | 3.30 |
| 3 | 4.30 |
| 4½ | 6.30 |
| 5 | 5.30 |
| 6 | 5 |
| 7 | 4 |

This ester thus possesses an anti-coagulant action which manifests itself after 2 hours, reaches a maximum between 4 and 5 hours and still remains high at the 7th hour.

EXAMPLE 4

HEPARIN ESTER OF 4-HYDROXY-N,N-DIMETHYL-BUTYRAMIDE

A solution of 9.5 g. of dicyclohexylcarbodiimide and 5.9 g. of 4-hydroxy-N,N-dimethyl-butyramide in 40 ml. of methylene chloride is added slowly to a solution of 3 g. of (1), prepared as in Example 1, in 60 ml. of methylene chloride and kept at 0°C. The mixture is left to stand for 3 days at 0°C. and then for 2 days at ambient temperature. The precipitate is filtered off, the solvent is evaporated in vacuo, and the residue is dissolved in 30 ml. of 95% ethyl alcohol.

The sodium salt of the ester formed is precipitated by adding 50 ml. of a 10% solution of sodium acetate in methanol. 1.35 g. of ester are thus obtained.

Analysis

Nitrogen: 2.9%
Sulphur: 11.5%
Infra-red spectrum: ester band at: 5.8μ
amide band at: 6 μ.

Anti-Coagulant Activity

The actual activity, determined according to the method of the Pharmacopee Francaise, is 60 I.U./mg. The potential activity, i.e., that measured after hydrolysis in N sodium hydroxide solution for one hour at 0°C., is 125 I.U./mg.

Anti-Coagulant Action in vivo

This action was studied in rabbits. It was measured by determining the coagulation time at regular intervals after subcutaneous injection. The product was administered at a dose of 400 units per kg. The following results were obtained:

| Hours of Administration | Coagulation Time (Minutes) |
|---|---|
| 0 | 13 |
| 1 | 16 |
| 2 | 19 |
| 4 | 19 |
| 6 | 16 |
| 7 | 15 |

This ester thus possesses a long-lasting anti-coagulant action at doses (expressed in actual units) which are lower than those of heparin.

We claim:

1. A heparin ester in which the carboxyl groups of heparin are esterified, partially or completely, by an alcohol or phenol chosen from the following categories:

A. pyridylalkanols of the formula:

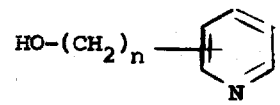

in which $n$ is 1, 2 or 3;

B. optionally substituted phenols of the formula:

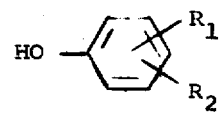

in which $R_1$ and $R_2$ each denote H, $NO_2$ or COOR where R is H or alkyl of 1 to 4 carbon atoms; and C. ω-hydroxy-amides of the formula:

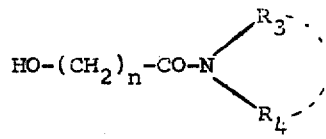

in which $n$ is 1, 2 or 3, and $R_3$ and $R_4$, taken separately, are each alkyl of 1 to 4 carbon atoms, or $R_3$ and $R_4$, taken together with the nitrogen atom to which they are attached, form a nitrogen-containing heterocyclic ring with 5 or 6 ring atoms which can contain a second hetero-atom of nitrogen or oxygen.

2. A heparin ester according to claim 1, in which the carboxyl groups of heparin are esterified, partially or completely, by a pyridylalkanol of the formula:

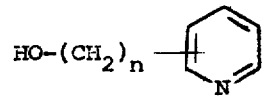

in which $n$ is 1 or 2.

3. A heparin ester according to claim 1, in which the carboxyl groups of heparin are esterified, partially or completely, by a substituted phenol of the formula:

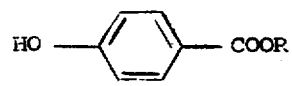

in which R is H or alkyl of 1 to 4 carbon atoms.

4. A heparin ester according to claim 1, in which the carboxyl groups of heparin are esterified, partially or completely, by an ω-hydroxy-amide of the formula:

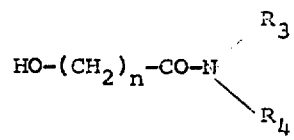

in which $n$ is 2 or 3 and $R_3$ and $R_4$ are both alkyl of 1 to 4 carbon atoms.

5. A heparin ester according to claim 1 in which the alcohol is 3-pyridylmethanol.

6. A heparin ester according to claim 1 in which the phenol is methyl p-hydroxybenzoate.

7. A heparin ester according to claim 1 in which the alcohol is 4-hydroxy-N,N-dimethyl-butyramide.

8. A heparin ester according to claim 1, in which the sulphate groups and non-esterified carboxyl groups are salified with alkali metal or alkaline earth metal cations or with quaternary ammonium cations originating from hyamine, choline or betaine.

9. A heparin ester according to claim 8, in which the alkali metal cation is the sodium cation.

10. Process for the preparation of a heparin ester which comprises:
  a. salifying heparin so that the sulphate groups are salified by quaternary ammonium cations originating from hyamine, choline or betaine, and the carboxyl groups are free; and
  b. esterifying resultant acid salt of heparin at a low temperature in a non-hydroxylic solvent in the presence of a condensation agent of the carbodiimide type with an alcohol or a phenol chosen from the following categories:
  A. pyridylalkanols of the formula:

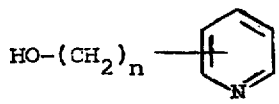

in which $n$ is 1, 2 or 3;
  B. optionally substituted phenols of the formula:

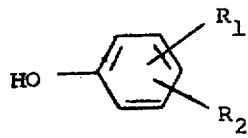

in which $R_1$ and $R_2$ each denote H, $NO_2$ or COOR where R is H or alkyl of 1 to 4 carbon atoms; and
  C. ω-hydroxy-amides of the formula:

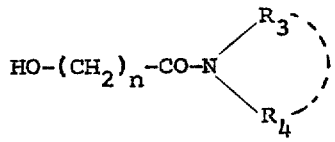

in which $n$ is 1, 2 or 3, and $R_3$ and $R_4$, taken separately, are each alkyl of 1 to 4 carbon atoms, or $R_3$ and $R_4$, taken together with the nitrogen atom to which they are attached, form a nitrogen-containing heterocyclic ring with 5 or 6 ring atoms which can contain a second hetero-atom; and
  c. separating the heparin ester salt thus obtained.

11. A heparin ester according to claim 1 wherein the carboxyl groups of heparin are esterified, partially or completely by a pyridylalkanol of category (A).

12. A heparin ester according to claim 1 wherein the carboxyl groups of heparin are esterified, partially or completely by an optionally substituted phenol of category (B).

13. A heparin ester according to claim 1 wherein the carboxyl groups of heparin are esterified, partially or completely by a ω-hydroxy-amide of category (C).

14. A heparin ester according to claim 13 wherein $R_3$ and $R_4$ are taken together and represent piperidino, piperazino or morpholino.

* * * * *